United States Patent [19]

Canevari et al.

[11] 4,371,025
[45] Feb. 1, 1983

[54] REINFORCING ANNULAR STRUCTURE OF RADIAL TIRES

[75] Inventors: Cesare Canevari; Aldo Signorini, both of Milan, Italy

[73] Assignee: Societa' Pneumatici Pirelli S.p.A., Milan, Italy

[21] Appl. No.: 271,963

[22] Filed: Jun. 9, 1981

[30] Foreign Application Priority Data

Jul. 8, 1980 [IT] Italy .............................. 23297 A/80

[51] Int. Cl.³ .......................... B60C 3/00; B60C 9/20
[52] U.S. Cl. ................................ 152/352 R; 152/359; 152/361 R; 152/361 DM; 57/902
[58] Field of Search ............... 152/330 R, 359, 361 R, 152/361 FP, 361 DM, 352 R, 352 A, 353 R, 353 C, 353 G; 57/902

[56] References Cited

U.S. PATENT DOCUMENTS 3,960,628  6/1976  Snyder .............................. 156/123
4,043,985  8/1977  Vock ................................. 152/359
4,284,117  8/1981  Poque et al. ..................... 152/361 R

*Primary Examiner*—Caleb Weston
*Assistant Examiner*—Lois E. Boland
*Attorney, Agent, or Firm*—Stevens, Davis, Miller & Mosher

[57] ABSTRACT

A radial tire is provided with an annular reinforcing structure comprising at least two layers of steel monofilaments arranged on a carcass having a radius of curvature, on the meridian plane in the crown point, equal to or greater than 400 mm.

4 Claims, 1 Drawing Figure

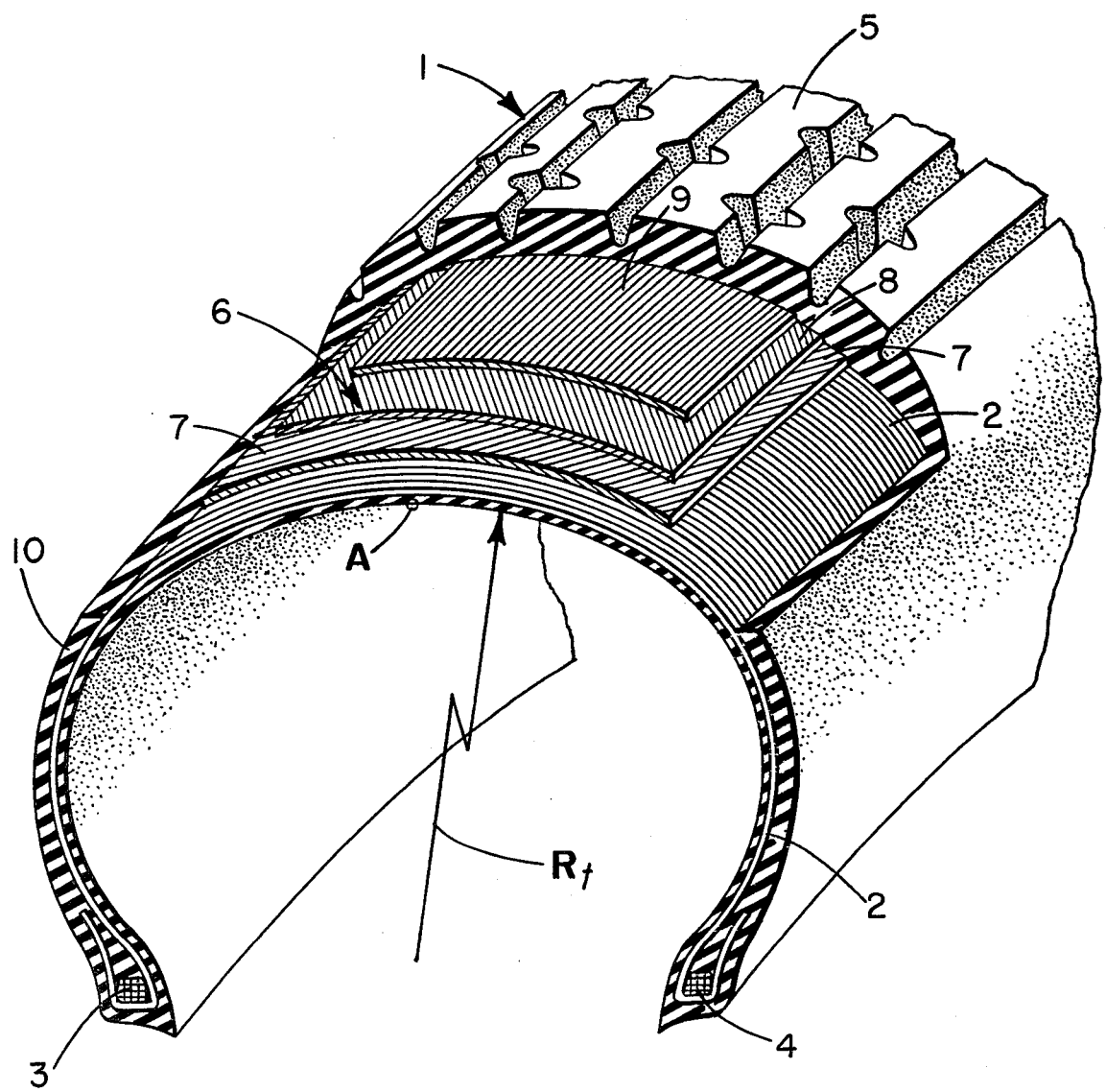

REINFORCING ANNULAR STRUCTURE OF RADIAL TIRES

This invention relates generally to vehicle tires and more particularly to an improved annular reinforcing structure inserted between the carcass and tread in a radial tire for motor vehicles.

In prior art radial tires, the annular reinforcing structures comprise a plurality of layers of metallic cords, parallel to one another, suitably inclined with respect to the direction of the equatorial plane of the tire, and embedded in an elastomeric material, each cord in its turn being a plurality of wires twisted together to form a strand.

The prior art structures, although in general meeting the various requirements of a tire are, unfortunately, a large part of the cost of a finished tire, because of the machinery and process required for stranding the wires to form the cords.

It has been known that the cost of the tire can be reduced by substituting a monofilament i.e. a single wire of a full section for the twisted strand because of the elimination of the stranding process.

However, because of the existence of great prejudices and of the problems involved in the manufacturing process it has not been possible to make the substitution and to produce an entirely satisfactory annular reinforcing structure.

Indeed, it is thought that cords wound loosely in open turns are more deformable and can be deformed more times without breaking than a single wire having an equal cross section. Consequently, reinforcing layers of twisted wire strands are used bearing their higher cost and renouncing to examine if the use of single non-twisted wires can produce a tire having improved performance in some resects, such as, for example, improved road holding characteristics and improved riding comfort.

An object of the invention is to provide a vehicle tire having a radial carcass and a tread band and an annular reinforcing structure between the tread band and carcass which is substantially devoid of the aforesaid disadvantages. Another object of the invention is to provide a vehicle tire having improved riding comfort and improved road holding characteristics. Still another object of the invention is to provide an improved annular structure for reinforcing the tread of a vehicle tire which provides for improved riding comfort and improved road holding characteristics of the tire.

BRIEF DESCRIPTION OF THE DRAWING

Other objects will become apparent from the following description with reference to the accompanying drawing wherein FIG. 1 is a perspective view of a cross section of one embodiment of a pneumatic vehicle tire with parts broken away to illustrate the structure of the tire and to expose the novel annular reinforcing structure disposed between the tread band and radial carcass of the tire.

The foregoing objects and others are accomplished in accordance with this invention, generally speaking, by providing a pneumatic tire to be mounted on a motor vehicle wheel having a carcass, a tread, a reinforcing annular structure between the carcass and tread, characterized by the fact that the reinforcing annular structure comprises at least two reinforcing layers of metal monofilaments, preferably steel, with the monofilaments of each layer disposed substantially parallel to one another and inclined at an angle between 10° and 30° with respect to the direction of the equatorial plane of the tire, the monofilaments of one layer crossing those of the adjacent layer, the carcass having a radius of curvature, on the meridian plane in the crown point which is equal to or larger than 400 mm.

The state radius of curvature, hereinafter called transverse radius, is critical, since tires in which the radius of curvature of the carcass is smaller or larger this value are respectively inadequate or suitable to the fatigue resistance.

When the tire has a transverse radius equal to or greater than 400 mm, it has been found that the monofilaments of the reinforcing layers although varying the bending state in the passage from the inside to the outside of the area of contact with the road surface, remain subjected to acceptable stresses, in particular compression stresses.

Moreover, the elastomeric material of the tire does not overheat substantially while the tire is in use on the vehicle wheel, running at a lower temperature than a conventional tire having strands of cords in the annular structure and the same transverse curvature.

In the case of conventional tires having strands of twisted wires, the metallic cords of the reinforcing annular structure are subjected continuously to variations of the curvature state consequent to variations of transverse curvature. In consequence of the compression stresses, the metallic cords of twisted wires tend to assume transverse dimensions which are larger than the mutual position of maximum compactness since the wires tend to draw away from each other and in consequence of tensile stresses the metallic cords tend to return to the position of maximum compactness.

In its turn the elastomeric material in which the cords are embedded is obliged to follow the settling variations, for an indefinite number of cycles with the development of heat. This situation does not happen in the tires of the invention.

Consequently, the hysteresis of the elastomeric material in the tires of the invention may be less than that of the conventional prior art tires with the advantage of a more constant behavior of the compound, with its characteristics remaining similar to those at the beginning, in particular in relation to long runs and to roads with a rough road bed.

Preferably, the tire is characterized by the fact that the monofilaments have a diameter of 0.08 to 0.05 mm.

Referring now to the drawing, tire 1 has a radial carcass 10 with reinforcing ply 2 turned up at its ends around bead cores 3 and 4, a tread 5 and an annular reinforcing structure 6 inserted between carcass 10 and tread 5.

The annular reinforcing structure comprises, respectively, a first layer 7 of steel monofilaments (single steel wires) parallel to one another and inclined at an angle of about 20° with respect to the direction of the equatorial plane of the tire, a second layer 8 of monofilaments parallel to one another and inclined at an angle of about 20° and opposite to that of the filaments of the first layer 7. In other words, the monofilaments of one layer are disposed to cross the monofilaments of the adjacent layer.

In another embodiment, the annular reinforcing structure has a third layer 9 of cords of textile material which shrink in length when heated, for example, nylon.

The carcass 2 has a predetermined curvature according to a choice of the transverse radius Rt, here defined as radius of curvature of the crown point A of the carcass meridian profile, i.e. the point located by the intersection of the meridian plane with the equatorial plane.

This radius Rt is 600 mm but may be any radius of 400 mm or more.

The monofilaments of the layers 7 and 8 are of high carbon steel (for example 0.7%), covered outside by a film of brass or bronze or other alloys which improves the adhesion of the monofilaments to the elastomeric material in which it is embedded.

The diameters of the monofilaments can vary within the range of 0.08 to 0.5 mm, with preferred values of 0.17 and 0.4 mm, for example, 0.25 mm.

The monofilaments preferably have a specific tensile strength of at least 2000 N/mm$^2$, a modulus of elasticity of 205,000 N/mm$^2$, an elongation of 1.4% for a stress equal to 100% of the tensile strength.

Tires having the above-said characteristics have, for example, a longitudinal radius of curvature of the carcass in the equatorial plane equal to about 240 mm.

The described tires have demonstrated a suitable fatigue resistance and improved characteristics over tires for the same use, but with annular reinforcing layers of metallic strands of twisted wires between carcass and tread.

For example, it has been noted that the tires of the invention have a wider and better defined contact area then the prior art conventional tires having twisted strands forming the annular reinforcing structure and have improved road holding characteristics in relation to the perpendicular stresses to the equatorial plane of the running tire, for example, when the tire runs along a curved trajectory.

Also, the present tire rides more comfortably. Although not disregarding all the involved variables falling within the complicated phenomena relating to the use of the tire, it is believed that the favorable results depend on the fact that with the same resistant section the reinforcing layers comprising untwisted monofilaments are thinner than twisted strands determining therefore, with equal load, a greater deformability of the tire with the consequent greater area of contact and with a sensible attenuation of the forces transmitted by the irregularities of the ground to the running vehicle but the applicants do not intend to be bound to such an explanation or theory.

Although a particular embodiment of the invention has been described in detail, it is to be understood that variations can be made therein without departing from the spirit and scope of the invention except as it may be limited by the claims.

What is claimed is:

1. A vehicle tire comprising a radial carcass having a crown point on a meridian plane, a tread, an annular reinforcing structure between the carcass and tread, said annular reinforcing structure comprising at least two reinforcing layers of metal monofilaments, each monofilament being embedded in said reinforcing layers as a single individual, metallic element spaced from the adjacent filaments, said monofilaments of each layer being parallel to one another and inclined at an angle between 10° and 30° with respect to the direction of the equatorial plane of the tire, the monofilaments of one layer crossing those of the adjacent layer, said carcass having a radius of curvature on the meridian plane in its crown point of at least 400 mm.

2. A pneumatic tire as in claim 1, characterized by the fact that said monofilaments have a diameter between about 0.08 and about 0.5 mm.

3. The tire of claim 1 wherein the said annular breaker structure comprises a layer of heat shrinkable textile cords.

4. The tire of claim 1, 2, or 3 wherein the said metallic cords are steel.

* * * * *